United States Patent [19]

Choate

[11] Patent Number: 4,561,679
[45] Date of Patent: Dec. 31, 1985

[54] SEAL PRESSURE REDUCTION SYSTEM

[75] Inventor: Thomas G. A. Choate, Houston, Tex.

[73] Assignee: Exxon Production Research Co., Houston, Tex.

[21] Appl. No.: 401,799

[22] Filed: Jul. 26, 1982

[51] Int. Cl.$^4$ .................. F16L 27/02; F16L 27/08
[52] U.S. Cl. ........................ 285/95; 285/106; 285/98; 285/190; 285/263; 285/276; 285/DIG. 1
[58] Field of Search ............. 285/95, 106, DIG. 1, 285/98, 276, 190, 263

[56] References Cited

U.S. PATENT DOCUMENTS

| | | | |
|---|---|---|---|
| 2,384,281 | 9/1945 | Carter ................. | 285/DIG. 1 X |
| 2,444,868 | 7/1948 | Allen et al. ............ | 285/276 X |
| 2,833,568 | 5/1958 | Corsette ............... | 285/98 X |
| 3,479,061 | 11/1969 | Smookler et al. ....... | 285/106 X |
| 3,729,699 | 4/1973 | Briggs et al. .......... | 339/42 |
| 3,746,372 | 7/1973 | Hynes . | |
| 3,788,395 | 1/1974 | Knoss et al. . | |
| 3,845,450 | 10/1974 | Cole et al. . | |
| 3,889,985 | 6/1975 | Gartmann ............. | 285/DIG. 1 X |
| 3,944,263 | 3/1976 | Arnold ................ | 285/106 X |
| 3,963,297 | 6/1976 | Panek et al. . | |
| 4,437,688 | 3/1984 | Kramer et al. ......... | 285/DIG. 1 X |

FOREIGN PATENT DOCUMENTS

| | | |
|---|---|---|
| 1533062 | 11/1978 | United Kingdom . |
| 1537595 | 1/1979 | United Kingdom . |
| 391344 | 7/1973 | U.S.S.R. ............ 285/DIG. 1 |

OTHER PUBLICATIONS

Machine Design: Axial Mechanical Seals, Mar. 9, 1967, pp. 27–28.

Primary Examiner—Thomas F. Callaghan
Attorney, Agent, or Firm—Alan J. Atkinson

[57] ABSTRACT

A seal pressure reduction system for protecting fluid seals located in the sealing gap between the moving parts of a fluid-carrying system from deterioration due to chemical action, excessive temperature or excessive pressure is disclosed. A first seal resistant to chemical action and excessive temperatures is installed in the sealing gap such that the front side of the first seal is in contact with the production fluid. A second seal resistant to excessive pressure is installed in the sealing gap between the first seal and the ambiance to form a sealed cavity along the sealing gap. A hydraulic fluid is located in the sealed cavity. A hydraulic pressure means located between and communicating with the production fluid and the hydraulic fluid is used to pressurize the hydraulic fluid. The hydraulic pressure means is actuated by the pressure of the production fluid to pressurize the hydraulic fluid to a pressure greater than, less than, or equal to that of the production fluid. Thus, the differential pressure acting on the first seal is reduced or eliminated while the second seal is isolated from deterioration induced by the production fluid. In an alternative embodiment, a plurality of second seals are used to form a plurality of sealed cavities between the first seal and the ambiance. Hydraulic fluid is located in each of the sealed cavities. Each sealed cavity has associated therewith a hydraulic pressure means. The initial hydraulic pressure means is actuated by the production fluid to pressurize the hydraulic fluid in the initial sealed cavity. Subsequent hydraulic pressure means are each actuated by the pressure of the hydraulic fluid in the preceding sealed cavity to pressurize the hydraulic fluid in its corresponding sealed cavity.

4 Claims, 4 Drawing Figures

SEAL PRESSURE REDUCTION SYSTEM

FIELD OF THE INVENTION

The present invention relates to a system for protecting fluid seals against deterioration due to chemical action, excessive temperature, and excessive pressure. More particularly, the present invention relates to a seal pressure reduction system which uses hydraulic pressure multipliers in combination with fluid seals to increase the life and reliability of the sealing system.

BACKGROUND OF THE INVENTION

The offshore production of oil and gas requires the use of substantially vertical, fluid-carrying pipes known as "flowlines" to convey fluids from a subsea wellhead to the water surface. Frequently, a number of flowlines are contained within a vertical tension member called a "riser." The upper end of the riser is connected to a floating vessel or buoy which is subject to lateral movement due to wind, waves, and ocean currents. To compensate for this lateral movement of the vessel or buoy about the stationary subsea wellhead, articulated joints are typically installed between the riser and the subsea wellhead. Swivels or articulated joints are also installed in the flowlines to allow the riser to move without damaging the flowlines. For example, one application of swivels in flowlines is disclosed in U.S. Pat. No. 4,318,423 to DeGraaf (1982).

Swivels and articulated joints in risers and other fluid-carrying systems must be adequately sealed so as to prevent leakage of the fluids into the ambient surroundings. Such fluids will be hereinafter referred to as "production fluids". Typically, pliable elastomeric or plastic fluid seals are utilized between the moving parts of a swivel or articulated joint to prevent leakage of the production fluid. Such pliable fluid seals are used because they form a more effective, leakproof seal than do harder metallic or composition seals. Successful operation of the fluid-carrying system requires that the fluid seals be reliable over the design life of the fluid-carrying system.

The demands on existing fluid seal technology have increased as the quest for crude oil and gas extends into newly discovered reservoirs. Such reservoirs are often located at depths far below the earth's surface, and fluids from such reservoirs are often produced at high temperatures and pressures. For example, deep gas wells may produce fluids at temperatures higher than 450° F. and pressures exceeding 10,000 pounds per square inch (psi). In addition, the fluids produced from such reservoirs are frequently "sour" fluids which contain high concentrations of hydrogen sulfide, carbon dioxide, and other contaminants.

Although fluid seals have been developed which have good resistance to deterioration induced by the chemical action of a sour fluid, these "product seals" tend to deteriorate when subjected to high temperatures and excessive pressures. For example, certain product seal elastomers resistant to chemical deterioration soften as the temperature of the product seal is increased. This softening reduces the tensile strength of the product seal and reduces its ability to resist damage due to excessive pressure. Conversely, other product seal elastomers become brittle at high temperatures. This embrittlement tends to cause the product seal to crack. Furthermore, such embrittlement reduces the resiliency of the product seal which lessens its sealing effectiveness.

Other product seal elastomers such as Fluorocarbons and Perfluoroelastomers which are resistant to chemical deterioration are also resistant to high temperatures. However, such product seals tend to be susceptible to damage due to excessive fluid pressures. The pressure tends to extrude the product seals into the sealing gaps between the moving parts of the swivel or articulated joint and may rupture the product seals. Pressure extrusion of such product seals also increases the wear of the product seals where they contact the sealing lip of the swivel or articulated joint.

Certain plastics are able to withstand the combination of high temperatures, high pressures, and corrosive environments. However, the sealing efficiency of fluid seals made from such plastics is limited. This is because fluid seals made from such plastics tend to be harder than elastomers and do not readily conform to slight irregularities of the mating surface of a swivel or articulated joint. As a result, plastic fluid seals do not seal as effectively as elastomers and often leak.

Fluid seals which can adequately withstand the combination of a corrosive fluid produced at high temperatures and excessive pressures while providing an effective, leakproof seal have not been developed. Thus, a need clearly exists for a sealing system capable of providing a reliable seal when exposed to the combination of these conditions.

Various sealing techniques have been developed to extend the useful life of fluid seals. However, each of these techniques has certain limitations. One such technique utilizes a second, redundant seal behind the first seal to seal the gap between the moving elements of the swivel or articulated joint. If the first seal fails, the second seal will prevent leakage until it also fails. While the second seal reduces the possibility of low pressure leakage, a failure of the first seal resulting from a sudden pressure increase will often rupture the second seal as well. Even if the second seal does not immediately fail, it will thereafter be exposed to the entire pressure of the production fluid and the sealing redundancy desired will no longer exist.

A second technique to extend the useful life of fluid seals uses back-up rings composed of metal or other hard compounds to prevent the softer fluid seal from being extruded into the sealing gap. The back-up ring is placed behind the fluid seal to reduce the size of the sealing gap. This technique combines the advantages of a soft fluid seal, which forms a more effective seal at low fluid pressures than does a more rigid fluid seal, with those of a hard back-up ring, which has a superior resistance to pressure extrusion. However, the use of a back-up ring is limited when the back-up ring is exposed to high temperatures. At high temperatures, the back-up ring will expand. Because the sealing gap between the back-up ring and the moving element of the swivel or articulated joint must be very small in order to prevent extrusion of the fluid seal, thermal expansion of the back-up ring may cause it to seize against the moving element. This will increase the wear and abrasion of the back-up ring and the moving element and will ultimately cause failure of the swivel or articulated joint. Reducing the diameter of the back-up ring to avoid this seizure will increase the size of the sealing gap that the back-up ring is designed to reduce.

A third technique to extend the life of fluid seals uses the combination of a floating piston seal, a stationary back-up seal, and an intermediate hydraulic fluid disposed between the seals. The piston seal is exposed to the production fluid on one side and the hydraulic fluid on the other. The production fluid pressure displaces the piston seal which in turn compresses the hydraulic fluid. The intermediate fluid is prevented from leaking into the ambiance by the back-up seal. See, e.g., E. G. & G. Sealol Thrust ring C-56839. However, a floating piston seal is limited in certain applications. While a floating piston seal eliminates the differential pressure acting on the piston seal, the system relies on movement of the piston seal and is not adaptable to an application where a stationary seal is required. In addition, the sealing effectiveness of the piston seal will be limited by variations in the temperature of the production fluid. At low temperatures, the piston seal will contract and the production fluid will leak into the "clean" hydraulic fluid. At higher temperatures, the piston will expand and seize against the walls of the cylinder.

Aside from the use of redundant seals, back-up rings, and floating piston seals to extend the life of the sealing system, certain other techniques have been developed to pressure balance the moving elements of an articulated joint. For example, in a ball and socket joint, the pressure of the production fluid will tend to force the wear surfaces of the ball and socket elements together. This thrusting force can damage the ball and socket elements by increasing the friction which abrades the wear surfaces. To reduce this thrusting force, a well-known application of the law of hydrostatics utilizes a hydraulic press, or pressure multiplier, to produce a force on the ball and socket elements which opposes the production fluid thrusting force. See, for example, U.S. Pat. Nos. 3,479,061 to Smookler et al (1966) and 3,746,372 to Hynes et al (1973) which disclose the use of a pressure multiplier to pressure balance ball and socket elements. In each of these patents, pressure from the production fluid is directed by a pressure multiplier to pressurize a hydraulic fluid. The hydraulic fluid, which is isolated from the production fluid by the pressure multiplier, is directed against the thrusting element of the joint to counterbalance the production fluid thrusting force. Back-up fluid seals located in the sealing gap between the ball and socket elements prevent the pressurized hydraulic fluid from leaking into the ambient surroundings. While the pressurized hydraulic fluid balances the production fluid thrusting force, the pressure acting on the back-up fluid seals is magnified rather than reduced. Thus, the objective of reducing the pressure which acts on the fluid seals is not accomplished.

While sealing systems have been developed to extend the life of fluid seals which are exposed to sour production fluids being transported at excessive temperatures and pressures, the effectiveness of each sealing system is subject to certain limitations. A need therefore exists for an improved seal pressure reduction system that can extend the life of a sealing system.

SUMMARY OF THE INVENTION

The present invention solves the problems enumerated above by providing a seal pressure reduction system which reduces or eliminates the pressure tending to extrude fluid seals in a swivel or articulated joint. The fluid seals, which prevent the production fluid from leaking into the ambiance, are located in the sealing gap between the moving elements of the swivel or articulated joint. In the preferred embodiment, the invention consists of a first seal placed in the sealing gap in contact with the production fluid, a second seal placed in the sealing gap between the first seal and the ambiance thereby forming a sealed cavity between the first seal and the second seal, a hydraulic fluid contained within the sealed cavity, and a pressure multiplier capable of being driven by the pressure of the production fluid to pressurize the hydraulic fluid. Thus, the differential pressure acting on the first seal is limited to the difference between the pressures of the production fluid and the hydraulic fluid.

As noted above, the production fluid may be a sour fluid produced at high temperatures and pressures. Thus, the selection of proper seal materials for the first seal and for the second seal will enhance the value of the present invention. Product seals resistant to deterioration induced by chemical action and high temperatures are preferably used for the first seal. Pressure seals resistant to extrusion by excessive pressures are preferably used for the second seal. In this manner the differential pressure acting on the weaker product seal is reduced while the pressure seal is isolated from the harmful effects of the production fluid.

In an alternative embodiment, the invention consists of a first seal placed in the sealing gap in contact with the production fluid, a plurality of second seals placed consecutively in the sealing gap so as to form a plurality of sealed cavities between the first seal and the ambiance, a hydraulic fluid contained within each sealed cavity, and a plurality of pressure multipliers, each pressure multiplier corresponding to one of the sealed cavities and capable of pressurizing the hydraulic fluid in its corresponding sealed cavity. The first pressure multiplier is driven by the pressure of the production fluid to pressurize the hydraulic fluid in the initial sealed cavity, and each succeeding pressure multiplier is driven by the pressure of the hydraulic fluid in the preceding sealed cavity to pressurize the hydraulic fluid in its corresponding sealed cavity. The differential pressure acting on each seal in the seal pressure reduction system is therefore reduced to a fraction of the production fluid pressure.

DESCRIPTION OF THE PREFERRED EMBODIMENTS

Figure 1:
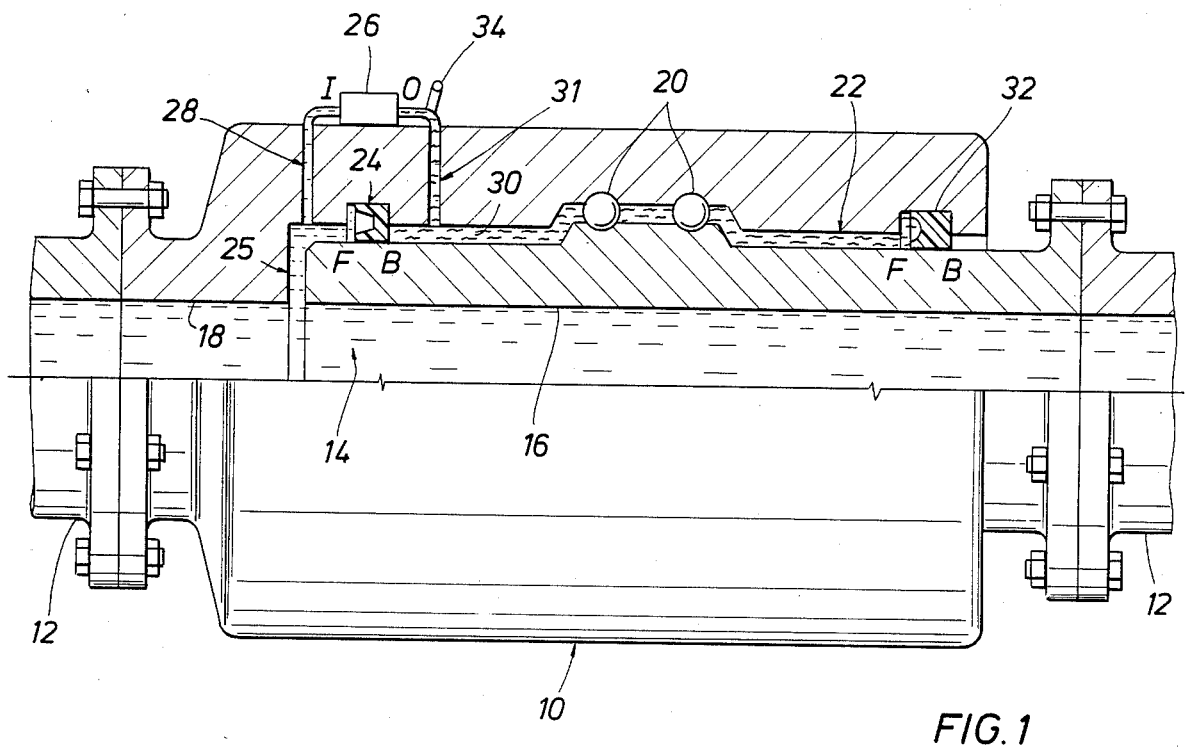
FIG. 1 illustrates a partial sectional view of the present invention adapted to a basic in-line swivel.

FIG. 1 illustrates the present invention adapted to a basic in-line swivel 10. In-line swivels are well-known in the art as a means for providing rotation between the axis of two adjacent segments of a fluid-carrying pipeline. Typically, both ends of the swivel 10 are flanged to permit connection of the swivel to a pipeline. Pipeline 12 is used to transport production fluid 14 which may be a "sour" fluid at a high temperature and a high pressure. Male end 16 rotates concentrically within housing end 18 of swivel 10. Bearings 20 prevent axial movement of male end 16 with respect to housing end 18 while permitting free rotation of these elements about the longitudinal centerline of swivel 10.

As illustrated in FIG. 1, the radial gap between male end 16 and housing end 18 is defined as sealing gap 22. Sealing gap 22 prevents contact between male end 16 and housing end 18. Thus, each moving element can rotate without abrading the other. The axial gap between male end 16 and housing end 18 is defined as end gap 25. Product seal 24 is located within sealing gap 22 near end gap 25 to isolate bearings 20 from production fluid 14 and to prevent leakage of production fluid 14 into the ambiance. The term "product seal" is used herein to generally describe a class of seals resistant to deterioration from chemical action and high temperatures. Each product seal has two sides referred to herein as the front ("F") and back ("B") sides. As illustrated in FIG. 1, the front side of product seal 24 is in contact with production fluid 14.

As noted above, production fluid 14 may be a sour fluid at a high temperature and a high pressure. For example, fluids produced from geothermal wells may contain steam or hydrogen sulfide compounds at temperatures as high as 650° F. and at pressures as high as 6500 psi. A deep sour gas well may produce fluids at temperatures higher than 450° F. and at pressures exceeding 10,000 psi. Because the temperature and chemical composition of each production fluid will vary from one well to another, each product seal should preferably be selected so as to be resistant to the temperature and chemical composition of the particular production fluid.

Referring again to FIG. 1, the front side of product seal 24 is subject to the pressure of production fluid 14. This pressure will tend to extrude product seal 24 into sealing gap 22. According to the present invention, production fluid 14 is also directed through channel 28 to actuate hydraulic pressure means 26. Hydraulic pressure means, commonly referred to as "pressure multipliers," are well known in the art. Hydraulic pressure means are typically used to transfer the force exerted by the pressure of one fluid to pressurize a second fluid. Referring to FIG. 1, hydraulic pressure means 26 has an inlet ("I") side and an outlet ("O") side. Production fluid 14 exerts a force on the inlet side of the hydraulic pressure means 26 which is equivalent to the pressure of production fluid 14 multipled by the area of the inlet side of hydraulic pressure means 26 exposed to production fluid 14. This relationship is expressed by the equation F(force)=P(pressure) A(area of hydraulic pressure means exposed to the pressure). Because the force transmitted by the hydraulic pressure means 26 is equivalent to the force exerted on the inlet side of hydraulic pressure means 26, the relationship between the inlet and outlet pressures (where I is the inlet and O is the outlet) are as follows: $F_I = F_O$; $P_I A_I = P_O A_O$; and $P_I/P_O = A_O/A_I$. Because of these relationships, the inlet pressure ($P_I$) will be greater than the outlet pressure ($P_O$) if the outlet area ($A_O$) of the hydraulic pressure means 26 is greater than the inlet area ($A_I$). The desired pressure multiplication or reduction can be achieved by selecting appropriate inlet and outlet areas for the hydraulic pressure means 26.

Pressure seal 32 is installed in sealing gap 22 between product seal 24 and the ambiance, thereby forming a sealed cavity between product seal 24, pressure seal 32 and the moving parts of swivel 10. The term "pressure seal" as used herein will refer to fluid seals which are resistant to extrusion through a sealing gap when exposed to high pressures. Like product seal 24, pressure seal 32 has a front ("F") and a back ("B") side. Hydraulic fluid 30 is placed in the sealed cavity. Channel 31 is formed between the outlet side of hydraulic pressure means 26 and the sealed cavity. As hydraulic pressure means 26 is actuated by the pressure of production fluid 14, hydraulic pressure means 26 pressurizes hydraulic fluid 30 through channel 31. The differential pressure acting on product seal 24 is therefore reduced to the difference between the production fluid 14 and hydraulic fluid 30 pressures. Hydraulic fluid 30 is prevented from leaking into the ambiance by pressure seal 32.

As stated above, product seal 24 is resistant to deterioration from the corrosive effects of production fluid 14 and to high temperatures, but is susceptible to pressure extrusion. Pressure seal 32 is resistant to pressure extrusion, but is susceptible to the corrosive effects of production fluid 14. Thus, the present invention overcomes the deficiencies of the individual seals by isolating each seal from the factors harmful to it. The use of product seal 24, pressure seal 32, and hydraulic pressure means 26 can be applied to swivels, rotary joints, ball and socket joints and other articulated pipe joints commonly used in fluid-carrying systems. The present invention is particularly advantageous when a sour production fluid is produced at high temperatures and pressures. The invention, however, can be utilized in a wide variety of fluid seal applications.

Referring again to FIG. 1, if hydraulic pressure means 26 pressurizes hydraulic fluid 30 to a pressure greater than that of the production fluid 14, the direction of the resultant pressure acting on product seal 24 will be reversed. (In such event, the direction of seal 24 would be reversed). This will prevent contamination of hydraulic fluid 30 by preventing migration or leakage of production fluid 14 around product seal 24. To account for any leakage of hydraulic fluid 30 into production fluid 14 or into the ambiance, a suitable hydraulic fluid make-up means 34, well known in the art, can be utilized to add hydraulic fluid 30 to the sealed cavity.

Figure 2:
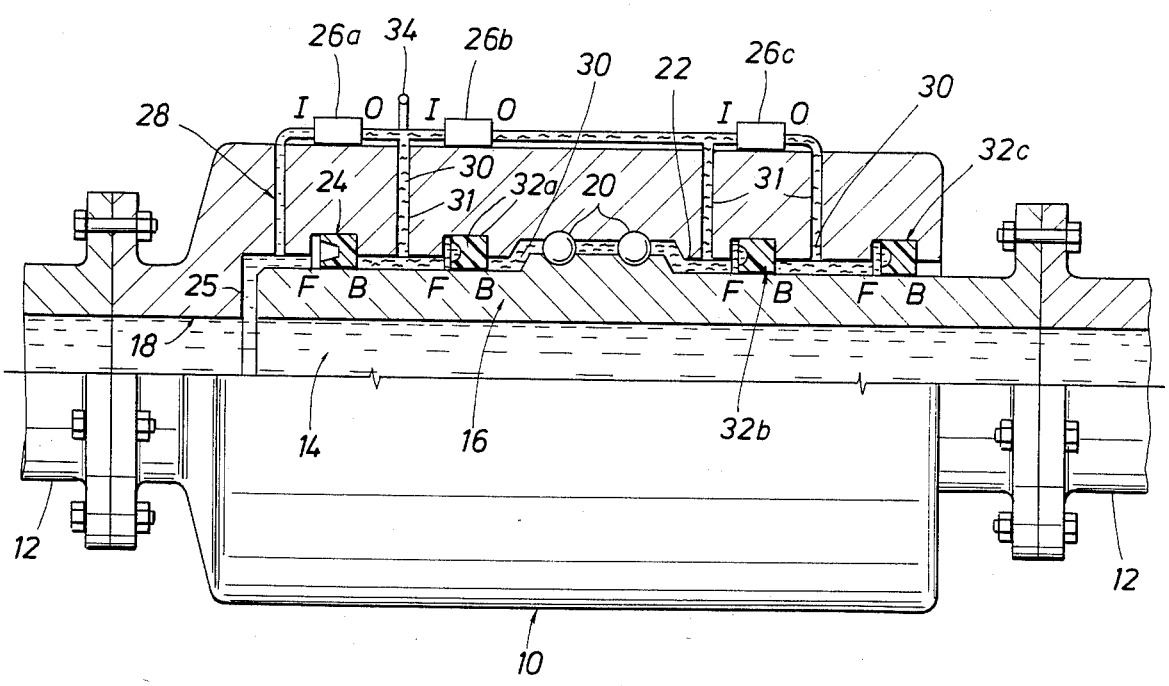
FIG. 2 illustrates a partial sectional view of an alternative embodiment of the present invention having multiple combinations of hydraulic pressure means and seal means.

FIG. 2 illustrates an alternative embodiment of the present invention adapted to in-line swivel 10. As described above, product seal 24 is located in sealing gap 22 to contain production fluid 14. Three pressure seals 32a, 32b, and 32c are located consecutively in sealing gap 22 to form three sealed cavities between product seal 24 and the ambiance. Each sealed cavity is filled with hydraulic fluid 30. Hydraulic pressure means 26a, 26b and 26c, corresponding respectively to the first, second, and third sealed cavities are attached to swivel 10. Hydraulic pressure means 26a is actuated by the pressure of production fluid 14 to pressurize the hydraulic fluid 30 in the first sealed cavity. Hydraulic pressure means 26b is actuated by the hydraulic fluid 30 in the first sealed cavity to pressurize the hydraulic fluid 30 in the second sealed cavity. Similarly, hydraulic pressure means 26c is actuated by the hydraulic fluid 30 in the second sealed cavity to pressurize the hydraulic fluid 30 in the third sealed cavity. The differential pressure acting on each pressure seal 32 in the system is limited to the difference between the pressures acting on its front and back sides. For purposes of illustration, FIG. 2 shows the use of three pressure seals and three sealed cavities. However, any number of pressure seals and sealed cavities may be used without departing from the scope of the present invention.

Figure 3:
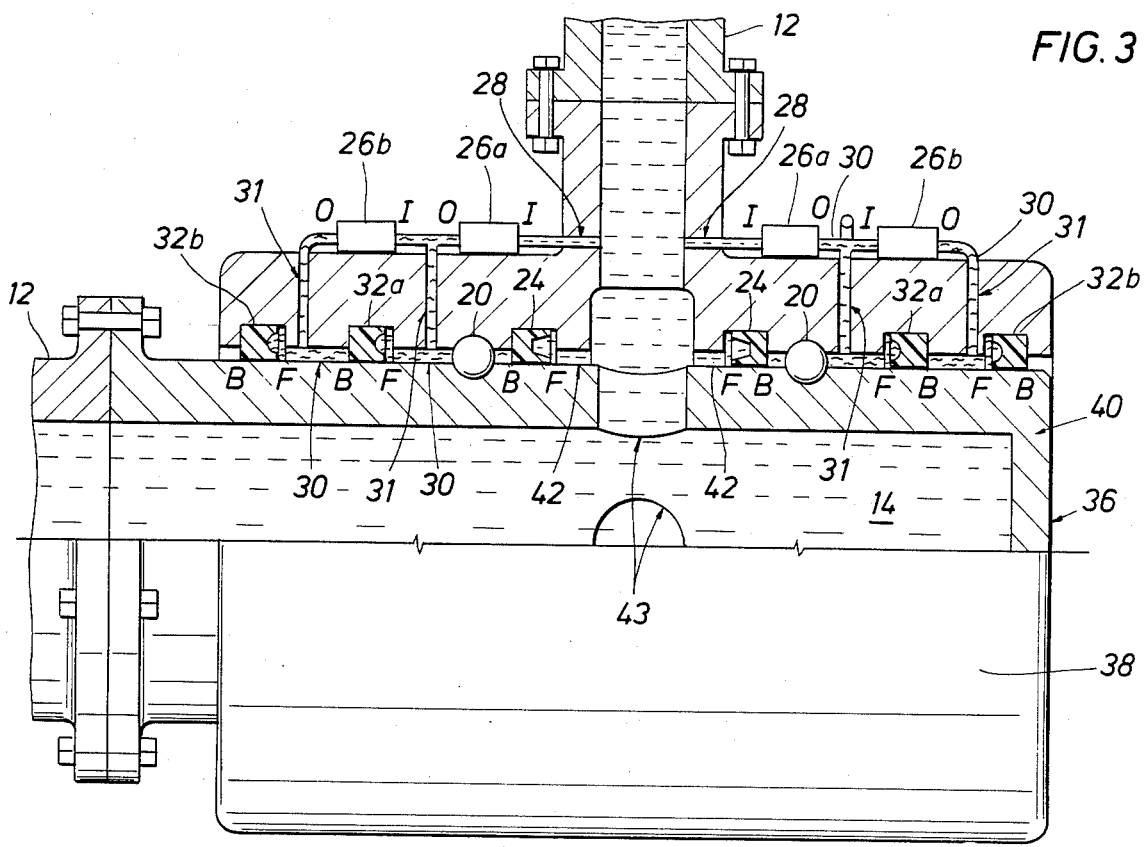
FIG. 3 is a partial sectional view of the present invention adapted to a basic concentric swivel, and showing the use of multiple combinations of hydraulic pressure means and seals.

FIG. 3 illustrates an alternative embodiment of the invention adapted to basic concentric swivel 36. Production fluid 14 is transported through pipeline 12. The moving elements of concentric swivel 36 are rotating end 38 and fixed end 40. Axial sealing gap 42 extends on either side of inlet 43. For clarity, the sealing system will be described for one side only. Product seal 24 is located in axial sealing gap 42 to prevent production fluid 14 from leaking into the ambiance. Pressure seals 32a and 32b are located in sealing gap 42 between product seal 24 and the ambiance to form two sealed cavities. Hydraulic fluid 30 is located in each sealed cavity. Hydraulic pressure means 26a and 26b, corresponding respectively to the first and second sealed cavities are attached to swivel 36. Hydraulic pressure means 26a is actuated by production fluid 14 to pressurize hydraulic fluid 30 in the first sealed cavity formed between product seal 24 and pressure seal 32a. Hydraulic pressure means 26b is actuated by hydraulic fluid 30 in the first sealed cavity to pressurize hydraulic fluid 30 in the second sealed cavity. This configuration is repeated on the other side of inlet 43. As stated previously with respect to FIG. 2, any number of pressure seals and sealed cavities may be used without departing from the scope of the present invention.

Figure 4:
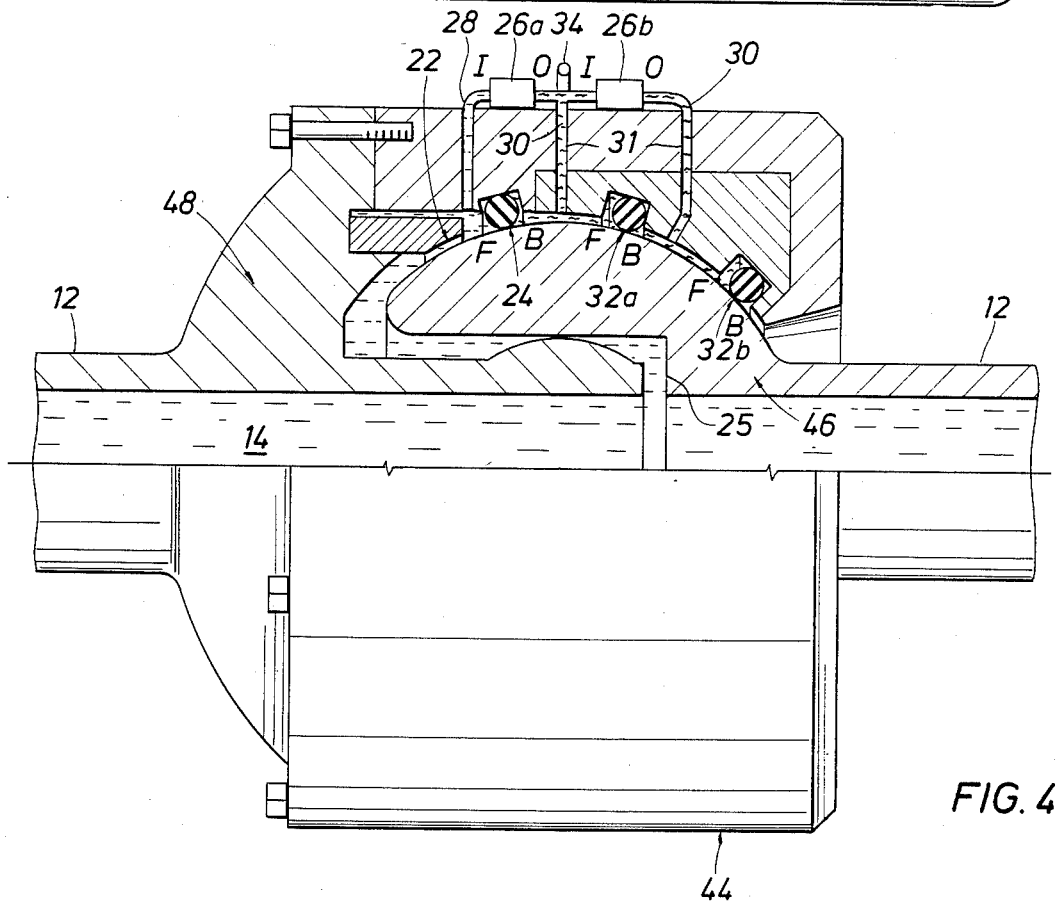
FIG. 4 is a partial sectional view of the present invention adapted to a ball and socket joint.

FIG. 4 illustrates the present invention adapted to ball and socket joint 44. Ball and socket joints are well known in the art as a means for connecting two pipe sections while providing angular movement therebetween. Ball end 46 and socket end 48 are functionally equivalent to male end 16 and housing end 18 of in-line swivel 10 as illustrated in FIGS. 1 and 2. Thus, the present invention operates in the manner described above when applied to ball and socket joint 44.

The seal pressure reduction apparatus of the present invention can be designed to limit the differential pressure acting on any seal in the system by using an appropriate number of hydraulic pressure means and product seals. For example, the mathematical description for the pressure reduction of the hydraulic pressure system illustrated in FIG. 2 can be derived from several fundamental relationships. Assuming that the pressure of production fluid 14 is $p_1$, and that the pressure of hydraulic fluid 30 in the first sealed cavity is $p_2$, let the ratio of outlet pressure ($p_2$) to inlet pressure ($p_1$) for the initial hydraulic pressure means 26a be $p_2/p_1 = B_1$. "B" is therefore a function of the physical dimensions of each hydraulic pressure means and may be a different value for each hydraulic pressure means. The value of B for hydraulic pressure means 26a, 26b, and 26c is $B_1$, $B_2$, and $B_3$ respectively. Where $p_3$ is the pressure of hydraulic fluid 30 in the second sealed cavity, and $p_2$ is the pressure of hydraulic fluid 30 in the first sealed cavity, let $p_3/p_2 = B_2$ for hydraulic pressure means 26b. Similarly, where $p_4$ is the pressure of hydraulic fluid 30 in the third sealed cavity, let $p_4/p_3 = B_3$ for hydraulic pressure means 26c. Further, let the differential pressure ("DP") acting on product seal 24 be expressed as $DP_1 = p_1 - p_2$. Similarly, let the differential pressures acting on pressure seals 32a and 32b be expressed respectively as $DP_2 = p_2 - p_3$ and $DP_3 = p_3 - p_4$. The differential pressure acting on pressure seal 32c is equivalent to the difference between $p_4$ and the ambient pressure.

The differential pressure acting on each seal in the system may be derived from the known value of $p_1$ and the known values of B for each hydraulic pressure means. The differential pressure acting on each seal may be expressed as follows:

$$DP_1 = p_1 - p_2, \text{ and } p_2 = B_1 p_1$$

therefore $$DP_1 = p_1 - B_1 p_1$$
$$= p_1(1 - B_1)$$

Similarly, for $DP_2$:

$$DP_2 = p_2 - p_3; \text{ and } p_2 = B_1 p_1, \; p_3 = B_2 p_2 = B_1 B_2 p_1$$

therefore $$DP_2 = B_1 p_1 - B_1 B_2 p_1$$
$$= B_1 p_1 (1 - B_2)$$

Similarly, for $DP_3$:

$$DP_3 = p_3 - p_4; \text{ and } p_3 = B_1 B_2 p_1, \; p_4 = B_3 p_3 = B_1 B_2 B_3 p_1$$

therefore $$DP_3 = B_1 B_2 p_1 - B_1 B_2 B_3 p_1$$
$$= B_1 B_2 p_1 (1 - B_3)$$

Note that $DP_4$ is equal to $p_4$ minus the ambient pressure. The value "B" for each hydraulic pressure means can be selected so that each seal in the system is subjected to the same differential pressure. By substituting the values $B_1 = \frac{3}{4}$, $B_2 = \frac{2}{3}$, and $B_3 = \frac{1}{2}$ into the preceding equations, the differential pressure (DP) acting on each seal is $\frac{1}{4} p_1$ rather than the original pressure $p_1$ exerted on product seal 24 in the absence of the present invention.

The seal pressure reduction system of the present invention protects fluid seals by reducing the pressure acting on product seals exposed to a production fluid. This pressure is reduced by permitting a pressurized hydraulic fluid to act on the back side of the product seal thereby reducing the differential pressure acting on the product seal. A pressure seal prevents leakage of the hydraulic fluid into the ambiance. The pressure seal is protected from deterioration induced by chemical action or excessive temperature of the production fluid. A series of hydraulic pressure means and corresponding seals can be used to reduce the differential pressure acting on each seal in the system. By limiting each seal to an environment compatible with its physical characteristics, the present invention overcomes the sealing problems previously discussed and increases the useful life of seal systems.

Slight variations of the present invention will produce certain advantageous results. For example, the hydraulic pressure means could have a multiplication factor of one. In such case, the differential pressure acting on the corresponding seal would be zero. Alternatively, the initial hydraulic pressure means could be used to multiply the production fluid imput pressure by a factor (B) greater than one while succeeding hydraulic pressure means multiply the input pressure by a factor (B) less than one. Such a configuration would prevent contamination of the first hydraulic fluid by the production fluid while allowing the seal pressure reduction system to reduce the differential pressure acting on each seal.

The present invention may be utilized in a wide variety of applications including, but not limited to, the transport of fluids from oil, gas, and geothermal wells. In addition, the present invention may be utilized in natural gas pipelines, power plants, refineries, and other chemical or industrial plants. The embodiments of the present invention described herein can be adapted to existing seal systems with only slight modification. In addition, the hydraulic pressure and fluid make-up means can be installed from the exterior of a swivel or articulated joint to provide ready access for any required maintenance.

Inasmuch as the present invention is subject to many variations, modifications, and changes in detail, it is intended that all subject matter discussed above or shown in the accompanying drawings be interpreted as illustrative and not in a limiting sense.

What is claimed is:

1. A seal pressure reduction system for protecting fluid seals against deterioration due to chemical action, temperature and pressure, said fluid seals being interposed in the sealing gap between two moving elements in a fluid-carrying system which transports a first fluid so as to prevent leakage of said first fluid into the ambiance, said system comprising:

means for retaining said elements together;
   first seal means resistant to deterioration induced by chemical action and temperature, said first seal means having a front side and a back side and being located in said sealing gap such that said front side is in contact with said first fluid; second seal means resistant to pressure, said second seal means having a front side and a back side and being located in said sealing gap between said first seal means and the ambiance so as to form a sealed cavity between said first seal means, said second seal means, and said moving elements;
   means for holding said first and second seal means in said sealing gap;
   a second fluid different from the first fluid which is enclosed within said sealed cavity and is in contact with the back side of the first seal means and the front side of said second seal means; and
   hydraulic pressure means actuated by the pressure of said first fluid for continuously pressurizing said second fluid to a pressure proportionately less than the pressure of the first fluid.

2. A seal pressure reduction system for protecting fluid seals against deterioration due to chemical action, temperature and pressure, said fluid seals being interposed in the sealing gap between two moving elements in a fluid-carrying system which transports a first fluid so as to prevent leakage of said first fluid into the ambiance, said system comprising:

means for retaining said elements together;
   first seal means resistant to deterioration induced by chemical action and temperature which has a front side and a back side and is located in said sealing gap such that said front side is in contact with said first fluid;
   a plurality of second seal means, each second seal means having a front side and a back side and being located consecutively in said sealing gap so as to form a plurality of sealed cavities along the length of said sealing gap between said first seal means and the ambiance;
   means for holding said first and second seal means in said sealing gap;
   a second fluid different from the first fluid which is enclosed within each of said sealed cavities; and
   a plurality of hydraulic pressure means, each such hydraulic pressure means corresponding to one of said sealed cavities, the initial hydraulic pressure means actuated by the pressure of said first fluid for continuously pressurizing the second fluid in the initial sealed cavity, and each succeeding hydraulic pressure means actuated by the pressure of the second fluid in the preceding sealed cavity for continuously pressurizing the second fluid in the corresponding sealed cavity to a pressure proportionately less than the pressure of the fluid in the preceding sealed cavity.

3. A seal pressure reduction system as recited in claim 2, wherein each of said second seal means is resistant to pressure.

4. A seal pressure reduction system for protecting fluid seals against deterioration due to chemical action, temperature and pressure, said fluid seals being interposed in the sealing gap between two moving elements in a fluid-carrying system which transports a first fluid so as to prevent leakage of said first fluid into the ambiance, said system comprising:

means for retaining said elements together;
   first seal means resistant to deterioration induced by chemical action and temperature which has a front side and a back side and is located in said sealing gap such that said front side is in contact with said first fluid;
   a plurality of second seal means, each second seal means having a front side and a back side and being located consecutively in said sealing gap so as to form a plurality of sealed cavities along the length of said sealing gap between said first seal means and the ambiance;
   a second fluid different from the first fluid which is enclosed within each of said sealed cavities;
   means for holding said first and second seal means in said sealing gap; and
   a plurality of hydraulic pressure means, each such hydraulic pressure means corresponding to one of said sealed cavities, the initial hydraulic pressure means actuated by the pressure of said first fluid for continuously pressurizing the second fluid in the initial sealed cavity to a pressure greater than the pressure of said first fluid, and each succeeding hydraulic pressure means actuated by the pressure of the second fluid in the preceding sealed cavity for continuously pressurizing the second fluid in the corresponding sealed cavity to a pressure proportionately less than the pressure of the fluid in the preceding sealed cavity.

* * * * *